Jan. 1, 1924. 1,479,338
J. G. P. THOMAS
METHOD OF TESTING GEAR WHEELS, UNIVERSAL JOINTS, AND OTHER POWER
TRANSMITTING MECHANISMS
Filed Feb. 4, 1920 6 Sheets-Sheet 1
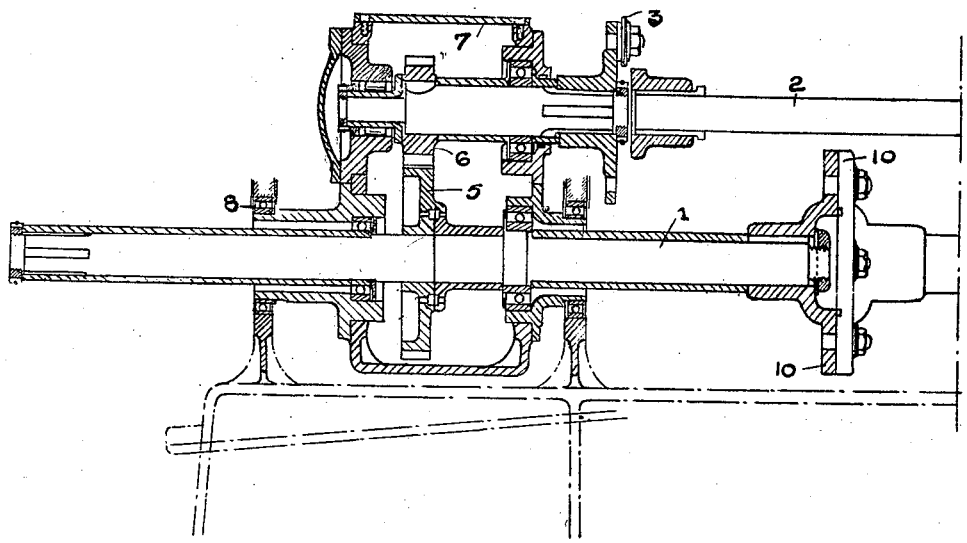
Fig:1.
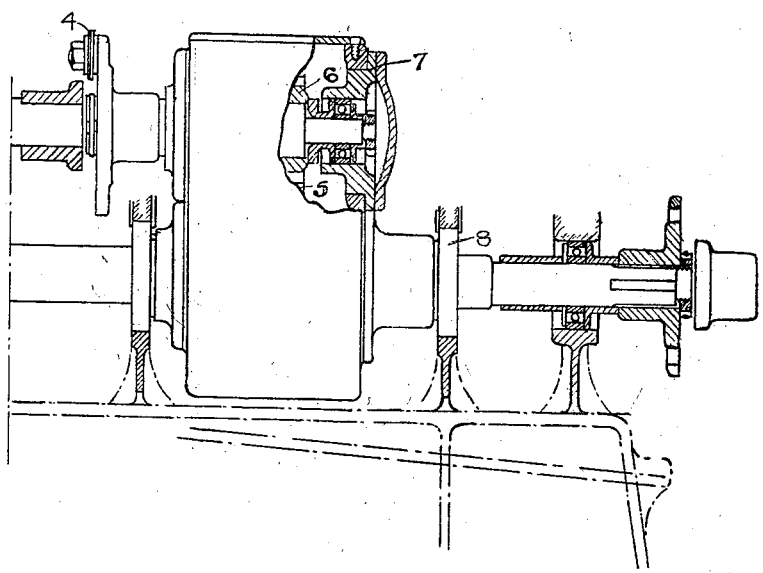

Jan. 1, 1924 1,479,338
J. G. P. THOMAS
METHOD OF TESTING GEAR WHEELS, UNIVERSAL JOINTS, AND OTHER POWER
TRANSMITTING MECHANISMS
Filed Feb. 4, 1920  6 Sheets-Sheet 2
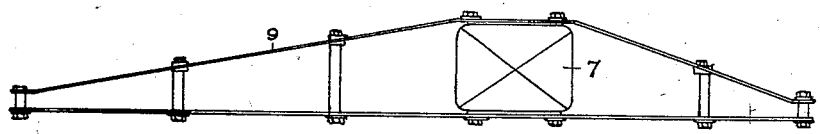
Fig: 2
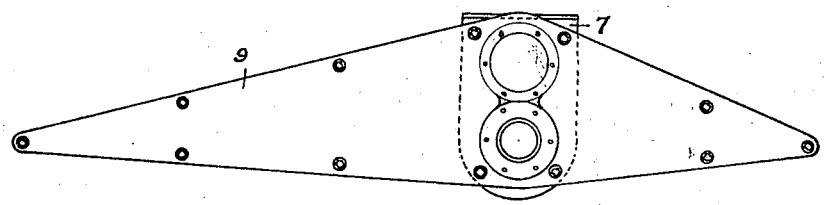
Fig: 3.
Inventor
John Godfrey Parry Thomas
per A.E. Odell
Attorney Jan. 1, 1924 
J. G. P. THOMAS
1,479,338
METHOD OF TESTING GEAR WHEELS, UNIVERSAL JOINTS, AND OTHER POWER
TRANSMITTING MECHANISMS
Filed Feb. 4, 1920
6 Sheets-Sheet 3
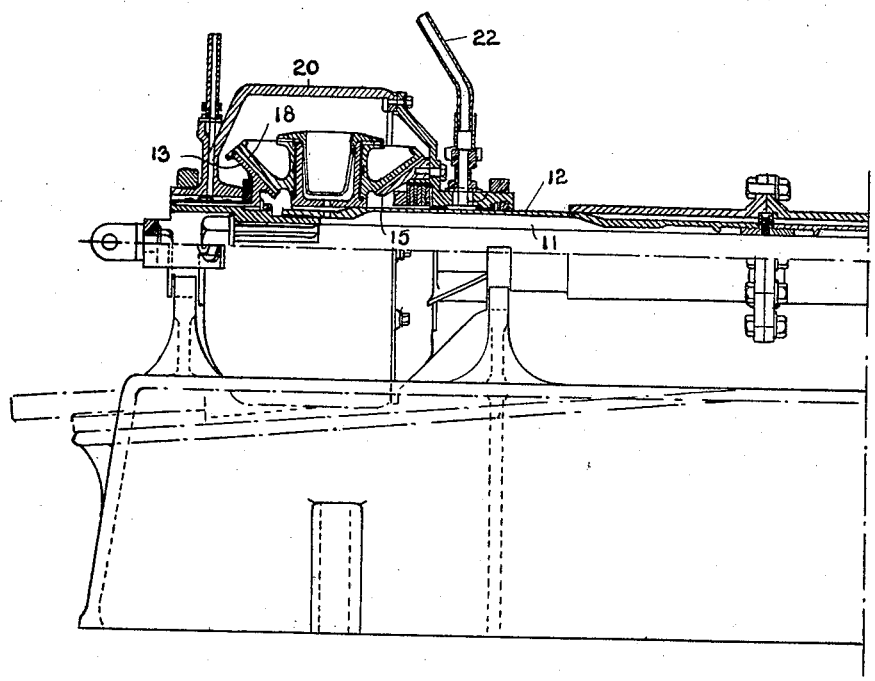
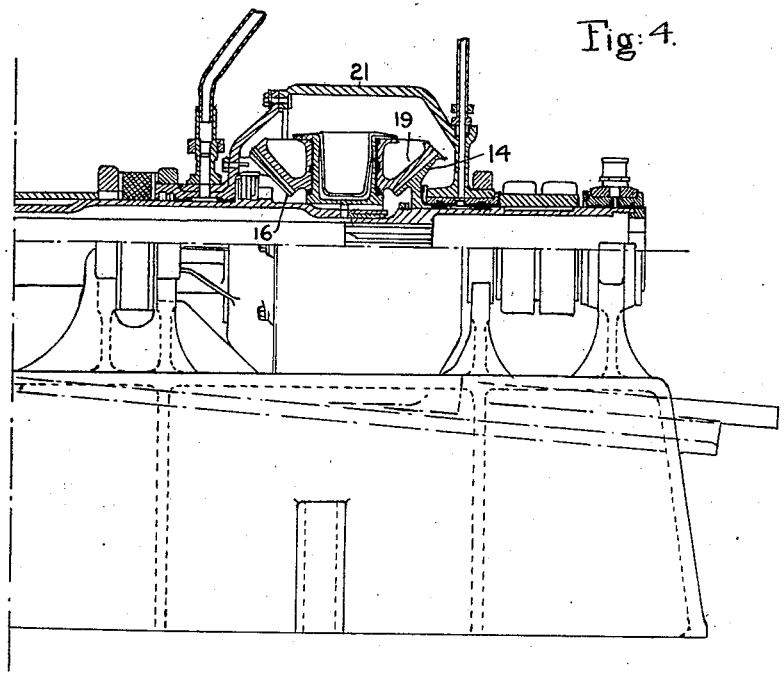
Fig. 4.
Inventor
John Godfrey Parry Thomas
per A. E. Odell
Attorney Jan. 1, 1924. 1,479,338
J. G. P. THOMAS
METHOD OF TESTING GEAR WHEELS, UNIVERSAL JOINTS, AND OTHER POWER
TRANSMITTING MECHANISMS
Filed Feb. 4, 1920 6 Sheets-Sheet 4
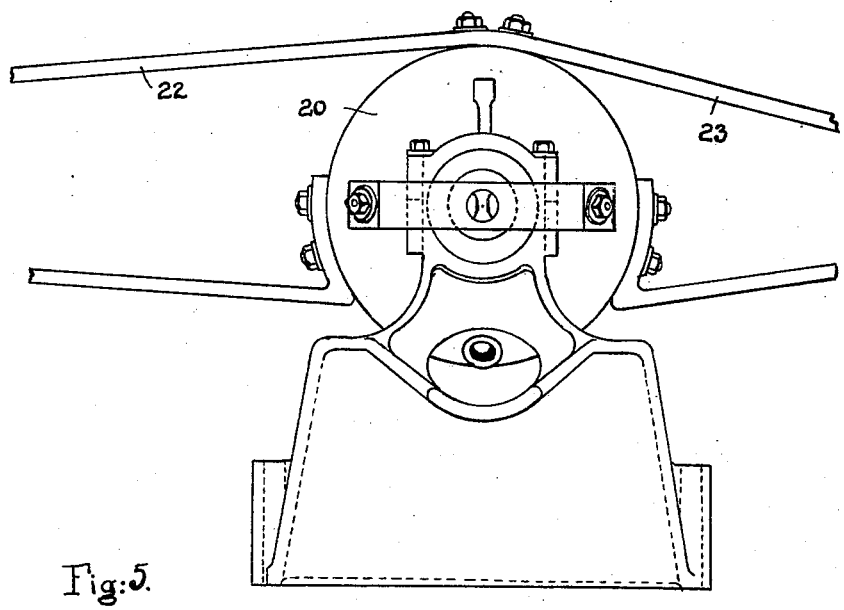
Fig:5.
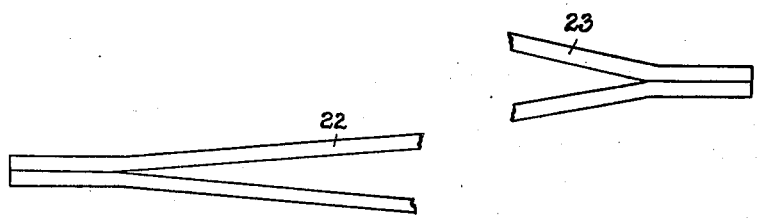

Jan. 1, 1924 1,479,338
J. G. P. THOMAS
METHOD OF TESTING GEAR WHEELS, UNIVERSAL JOINTS, AND OTHER POWER
TRANSMITTING MECHANISMS
Filed Feb. 4, 1920 6 Sheets-Sheet 5

Inventor
John Godfrey Parry Thomas
per A. E. Odell
Attorney.

Patented Jan. 1, 1924.

1,479,338

UNITED STATES PATENT OFFICE.

JOHN G. P. THOMAS, OF PRESTON, ENGLAND.

METHOD OF TESTING GEAR WHEELS, UNIVERSAL JOINTS, AND OTHER POWER-TRANSMITTING MECHANISMS.

Application filed February 4, 1920. Serial No. 356,183.

*To all whom it may concern:*

Be it known that I, JOHN GODFREY PARRY THOMAS, a subject of the King of Great Britain and Ireland, residing at 5 Lathom Street, Preston, Lancashire, England, have invented a new and useful Method of Testing Gear Wheels, Universal Joints, and Other Power-Transmitting Mechanisms, of which the following is a specification.

This invention relates to an improved apparatus whereby power transmitting mechanism such as gear wheels and universal joints can be subjected to any load, at any desired speed, for any desired period without wasting the power that is being transmitted through them; and consists generally of a means of causing power to circulate through a mechanical circuit, the power lost in friction being supplied from some external source such as an electric motor. The apparatus may be employed both for "running-in" gearing, and also for testing the efficiency of the gearing or other transmission elements.

To this end a complete ring or circuit of mechanical elements is built up, each driving the next; but one or more elements are arranged to have an extra degree of freedom to permit the members of the circuit to become strained, and means are provided by which the strains to which the members are subjected may be varied even while the apparatus is in motion. In the preferred construction hereinafter described two substantially parallel shafts are connected with each other at their two ends by means of spur or other gearing. One shaft is mounted so as to be capable of limited bodily rotation about the other. By applying opposite stresses at the two ends of the movable shaft any desired pressure may be created between the teeth of the intermeshing gears, and therefore any desired amount of power may be set in circulation, being transmitted as a torque along one shaft, then by the pressure of the teeth between the intermeshing gears, then as a torque along the other shaft and again as a pressure between the teeth through the other gears. Such an arrangement can be kept in continuous operation by supplying merely the energy lost in friction and otherwise in the transmission. It is therefore possible to subject the transmission elements to a prolonged test in which they are caused to transmit any desired power at a very small actual expenditure of energy.

Three forms of construction are illustrated in the accompanying drawings.

Figure 1 is an elevation in attached portions partly in section of an apparatus for "running-in" and testing spur gear and universal joints, parts being broken away to economize space.

Figure 2 is a plan, and

Figure 3 a side view of the beams by means of which the stress is applied.

Figure 4 is an elevation in detached portions, partly in section, of an apparatus partly broken away for use with bevel gearing.

Figure 5 is a view of this apparatus also in detached portions at right angles to Figure 4.

Figure 6:
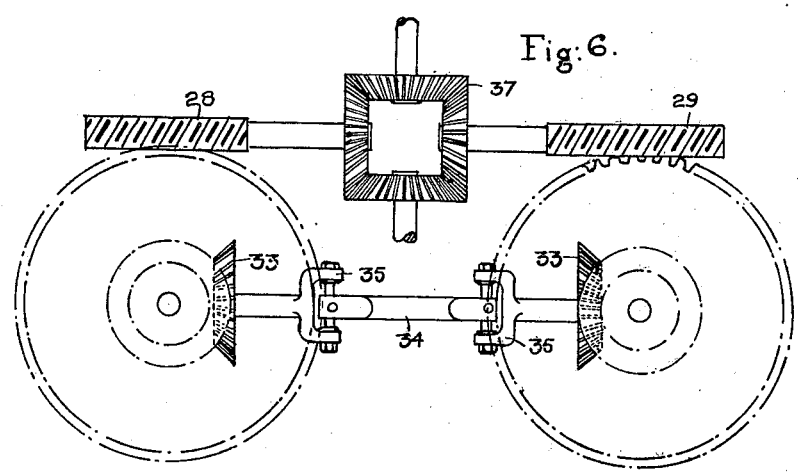

Figure 6 is an elevation and

Figure 7:
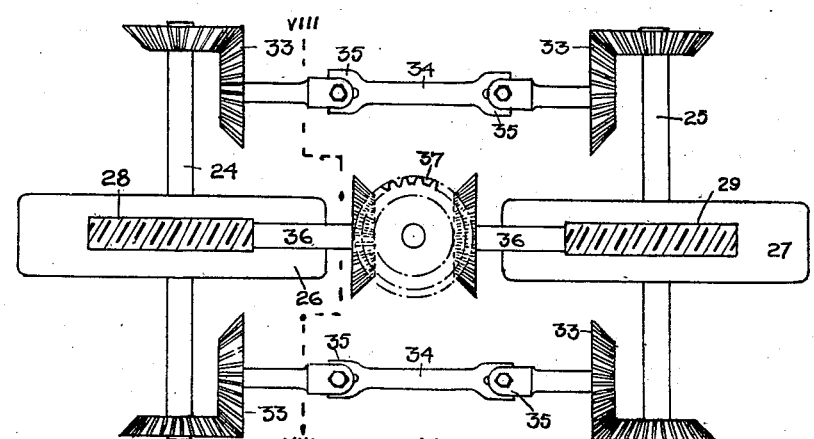

Figure 7 a plan, both diagrammatic, of an arrangement for running-in and testing differential gearing for the back axles of motor vehicles.

Figure 8:
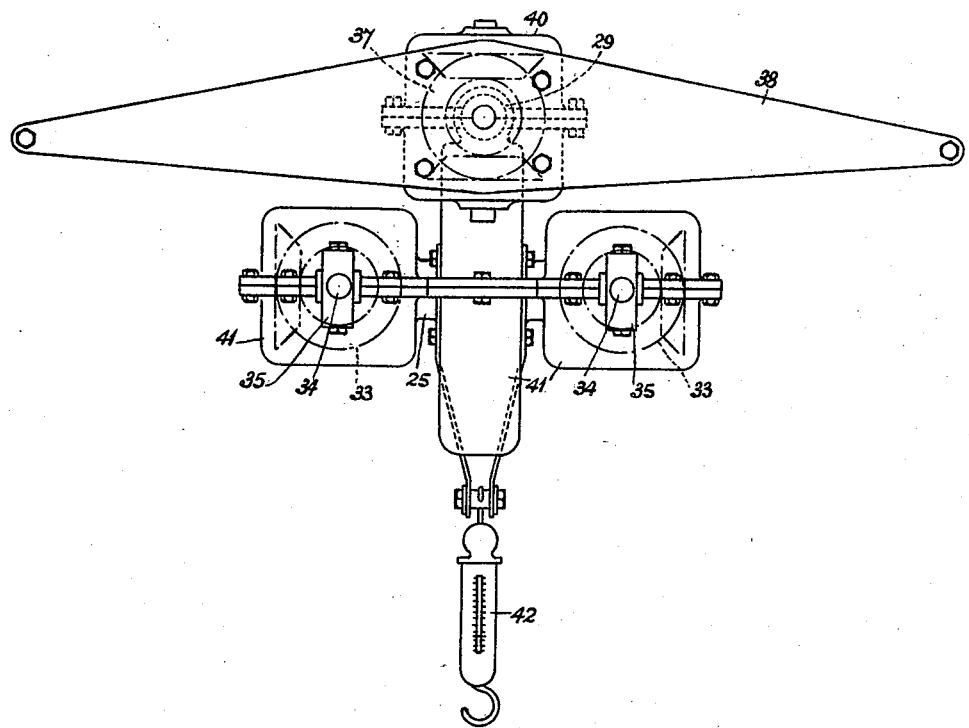

Figure 8 is a diagrammatic cross section of said arrangement on the line VIII—VIII of Figure 7.

In the arrangement shown in Figures 1 to 3 there are two parallel shafts 1 and 2, the latter of which is equipped near its ends with universal joints, flexible couplings or the like 3, 4, which enable one end of the shaft to move slightly relatively to the other. Each shaft at its ends carries pinions or gear wheels, in this case spur wheels 5, 6 respectively. These pairs of gears are mounted in suitable gear boxes 7 each of which is rotatable in roller bearings 8 upon a suitable bedplate. The bearings 8 are concentric with the shaft 1 which in turn has bearings within the casings 7. Each casing therefore is capable of rotation about the shaft 1. The shaft is prolonged as indicated at the left hand side of Figure 1 for connection to an electric motor or other suitable source of power from which the losses in transmission may be supplied.

To each of the casings 7 there is attached a light beam 9, which may be constructed as shown in Figures 2 and 3. This is bolted to the casing and carries at or near its ends knife edges adapted to support scale pans or the like (not shown) by means of which the beams may be weighted. Alternatively a spring balance may be employed for applying the desired stress to the beam. The beams extend in opposite directions from the transmission circuit, so that the weight upon one tends to twist one casing 7 clockwise, while the weight on the other tends to twist the other casing anticlockwise.

It will be clear that if equilibrium is established the torque upon one casing 7 due to the weight on its beam must be counterbalanced by the torque upon the casing due to the pressure between the teeth of the intermeshing gear wheels. By loading the beams any desired pressure between the teeth may be produced. The result is slightly to displace the ends of the shaft 2 from one another and so to vary the inclination of its intermediate portion. The bedplate should be substantial in order that it may be certain that the wheels 5 are rotating upon the same axis. By means of the electric motor or other source of power the shaft 1 may be rotated at any desired speed. Power is then circulating in the system, the amount of which is determined by the speed of rotation and the pressure between the gear teeth. Were there no friction the weight upon one beam would, in equilibrium, be the same as the weight on the other, but owing to friction and like losses in transmission the beams are in equilibrium when one carries a slightly less weight than the other. The difference in these weights is a measure of the loss of power in the whole system in the existing conditions of speed and power transmitted. An accurate division of the loss between the two sets may be obtained by comparing the temperature rises of the oil in the two boxes.

It is clear that the performance of the whole system depends upon the efficiency of each of its elements, but if only one element is changed the different results obtained enable a comparison to be made between the different elements that have been substituted the one for the other. For instance, if one pair of gear wheels is removed and replaced by another the change in the power loss will be due to the change in that pair of gear wheels. Or gear wheels may be tested in sets of two pairs; or wear after a certain time can be accurately compared. If instead the same gear wheels are used but the shaft is changed, a shaft with a different type of universal coupling being substituted, then the change in performance will show the merits of the different types of coupling. In order that a flexible shaft may be tested under various conditions of inclination the shaft 1 may be built in two parts, coupled together by means of flanges 10 which are fastened by bolts passing through slots. By loosening these bolts the two parts of the shaft 1 can be rotated slightly in relation to one another and recoupled. Yet again, the transmitting elements of the system being left unaltered the type of bearings employed may be changed and the effect noted. If desired the apparatus can be arranged to carry two standard gear boxes, and direct tests carried out with the gears in their own boxes provided suitable arrangements are made for coupling together the two lay shafts through universal joints.

Figures 4 and 5 show a similar testing arrangement applied to bevel gearing and suitable for testing differential gears of motor vehicles and the like.

The two shafts 11, 12, are now concentric. The former carries the sun pinions 13 and 14, and the latter the sets of planet pinions 18 and 19. The sun wheels 15 and 16 are fastened to the respective gear casings 20 and 21 to which are attached beams 22 and 23 substantially as already described.

By a modification of this arrangement complete back axles for motor vehicles may be run in and tested. The scheme is shown diagrammatically in Figures 6 and 7. Two back axles 24, 25, complete with differential gears 26, 27, and worm drives 28, 29 have bevel wheels 30, 31, fitted on their ends in place of the vehicle wheels. Each bevel wheel on the one axle is connected with one upon the other by bevel gearing 33 and a shaft 34 having universal joints 35. The worms are joined by shafts 36 and a differential gear 37.

For the purpose of determining the power to be circulated, the casing 40 of the differential gear 37, shown only in Figure 8, is mounted so that it can rock about the shafts 36, and is provided with a beam 38 in the manner already described so that any desired torque may be applied to the casing in either direction, and thus any desired pressure created between the teeth of the gear. In order that the efficiency may be measured the ends of the shafts 34 are supported in gear boxes, one of which 41 is shown in Figure 8, which can rock about the shafts 24, 25 respectively. These, too, have torque-exerting means, shown in Fig. 8 as a spring balance 42.

What I claim is:

1. In combination, a circuit of mechanical power transmission elements each positively driving the next on one side and positively driven by the next on the other side, at least one of said elements having an additional degree of freedom, means for imparting movement to said transmission elements and supplying power to make up losses, and means for applying force to the element having an additional degree of freedom to move said element so as to strain all the elements.

2. In combination, a circuit of mechanical power transmission elements each driving the next on one side and driven by the next on the other side, means for imparting movement to said transmission elements and supplying power to said circuit to make up losses, means for applying a measured stress to said elements to determine the power transmitted, and means for varying the applied stress in said elements while the circuit is in action.

3. In combination, a circuit of mechanical power transmission elements each positively driving the next on one side and positively driven by the next on the other side, means for imparting movement to said transmission elements and supplying power to said circuit to make up losses, means for straining said transmission elements to determine the power transmitted, and means for measuring the difference between the power transmitted at two different points in the circuit.

4. In combination, a circuit of mechanical power transmission elements each driving the next on one side and driven by the next on the other side, means for imparting movement to said transmission elements and supplying power to said circuit to make up losses, means for straining said elements to determine the power transmitted, means for varying the strain in said elements while the circuit is in motion, and means for measuring the difference between the power transmitted at two different points in the circuit.

5. In combination, a circuit of power transmission elements each driving the next on one side and driven by the next on the other side, said elements including a pair of intermeshing gear wheels each rotatable upon its axis and one of them rotatable about the axis of the other, means for imparting motion to said elements and supplying power to said circuit to make up losses, and means for applying a torque tending to rotate one of said gear wheels about the axis of the other to determine the pressure between their intermeshing teeth.

6. In combination, a shaft, bearings for said shaft, means for supplying power to said shaft, gear wheels secured to said shaft spaced apart thereon, a second shaft parallel with the first, a gear box rotatable about the first shaft, bearings in said gear box supporting said second shaft, gear wheels upon said second shaft spaced apart thereon and meshing with the gear wheels on the first shaft respectively, and means for applying torques to the bearings of said second shaft tending to rotate its ends in opposite directions about the first shaft.

7. In combination, a shaft formed in two parts bearings for each part thereof, means for varying the angular relation of the parts of said shaft and for securing them together in any desired angular relation, means for supplying power to said shaft, gear wheels secured to said shaft one upon each part thereof, a second shaft substantially parallel with said first shaft and having flexible couplings at its ends, gear wheels secured to said shaft through said flexible couplings and meshing respectively with the gear wheels of said first shaft, and bearings for said gear wheels rotatable about said first shaft.

8. In combination, two shafts, a plurality of trains of gearing of the same speed ratio each train interconnecting the two shafts, supports for said shafts and trains of gearing including a movable member supporting and withstanding the reaction of an element of one of said trains, means for opposing a variable force to the movement of said member and thereby variably straining the trains of gearing and the shafts, and means for supplying power to one of said shafts.

9. In combination, two shafts, a plurality of trains of gearing of the same speed ratio each train interconnecting the two shafts, supports for said shafts and trains of gearing including a movable member supporting and withstanding the reaction of an element of one of said trains, a second movable member supporting and withstanding the reaction of another element of one of said trains, means for opposing a variable force to the movement of said first member and thereby variably straining the trains of gearing and the shafts, and means for equilibrating said second member against the reaction it withstands and thereby determining the magnitude of the reaction.

10. In combination, a circuit of mechanical power transmission elements each positively driving the next on one side and positively driven by the next on the other side, supports for said elements withstanding their reactions one of said supports being movable under the reaction, and means for applying a measured and variable stress to oppose the movement of said movable support.

11. In combination, a circuit of mechanical power transmission elements each positively driving the next on one side and positively driven by the next on the other side, supports for said elements withstanding their reactions a plurality of said supports being movable under the reaction, and adjustable means for opposing the movement of said movable supports.

12. In combination a circuit of mechanical power transmission elements each positively driving the next on one side and positively driven by the next on the other side, supports for said elements, means for putting said elements in motion, means for applying a measured strain to one of said elements, and means for measuring the reaction of another of said elements on its support.

In testimony whereof I have signed my name to this specification.

J. G. P. THOMAS.